United States Patent [19]
Cusitar

[11] Patent Number: 5,299,674
[45] Date of Patent: Apr. 5, 1994

[54] CONVEYOR SYSTEM AND METHOD EMPLOYING A MOBILE BELT SUPPORT STRUCTURE

[75] Inventor: Wayne S. Cusitar, Saskatchewan, Canada

[73] Assignee: Westfalia Mining Progress, Inc., Charleston, W. Va.

[21] Appl. No.: 810,407

[22] Filed: Dec. 20, 1991

[51] Int. Cl.$^5$ ............................................. B65G 41/00
[52] U.S. Cl. ................................... 198/303; 198/861.2
[58] Field of Search ............... 198/300, 303, 317, 318, 198/829, 830, 861.1, 861.2, 861.4

[56] References Cited

U.S. PATENT DOCUMENTS

| | | | |
|---|---|---|---|
| 2,796,999 | 6/1957 | Russell | 198/303 X |
| 2,879,884 | 3/1959 | Joy | 198/303 |
| 3,557,937 | 1/1971 | Kahre | 198/861.2 |
| 3,863,752 | 2/1975 | Sibley | 198/303 |
| 4,031,997 | 6/1977 | Nelson | 198/303 X |
| 4,206,840 | 6/1980 | Hanson | 198/303 X |
| 4,256,213 | 3/1981 | Shaw et al. | 198/303 |
| 4,382,607 | 5/1983 | Voight | 198/303 X |
| 4,538,722 | 9/1985 | Sumner | 198/861.2 |
| 4,951,801 | 8/1990 | Mraz | 198/303 |
| 5,056,655 | 10/1991 | Justice | 198/303 X |

FOREIGN PATENT DOCUMENTS

1046175 10/1983 U.S.S.R. ............................ 198/861.2

*Primary Examiner*—James R. Bidwell
*Attorney, Agent, or Firm*—Morgan & Finnegan

[57] ABSTRACT

A mobile belt support car for a conveyor system having an extensible conveyor belt which includes a troughing strand and a return strand. Each car of a mobile support structure includes a longitudinal frame having first and second opposite axial ends, first and second horizontally pivoting joints provided respectively at the first and second opposite axial ends of the longitudinal frame, a transverse beam fixedly connected to the longitudinal frame and having first and second opposite axial ends, first and second wheels supported respectively at the first and second opposite axial ends of the transverse beam, and a first idler frame assembly mounted on the longitudinal frame and including an upper cantilevered beam, a lower cantilevered beam, the first and second cantilevered beams extending towards the extensible conveyor belt, and upper rollers, mounted on the upper cantilevered beam, for supporting the troughing strand of the extensible conveyor belt.

12 Claims, 9 Drawing Sheets

CONVEYOR SYSTEM AND METHOD EMPLOYING A MOBILE BELT SUPPORT STRUCTURE

BACKGROUND OF THE INVENTION

1. Field of the Invention

The present invention relates generally to underground mining and, more specifically, to a mobile belt support structure for an extendable conveyor belt used in a continuous mining operation.

2. Description of the Related Art

In the use of extensible conveyors in mining, it is usual to employ some type of collapsible belt conveyor structure in the extensible reach portion of the conveyor which may be floor mounted on individual sliding bases or carried on a stand carrier.

Figure 14:
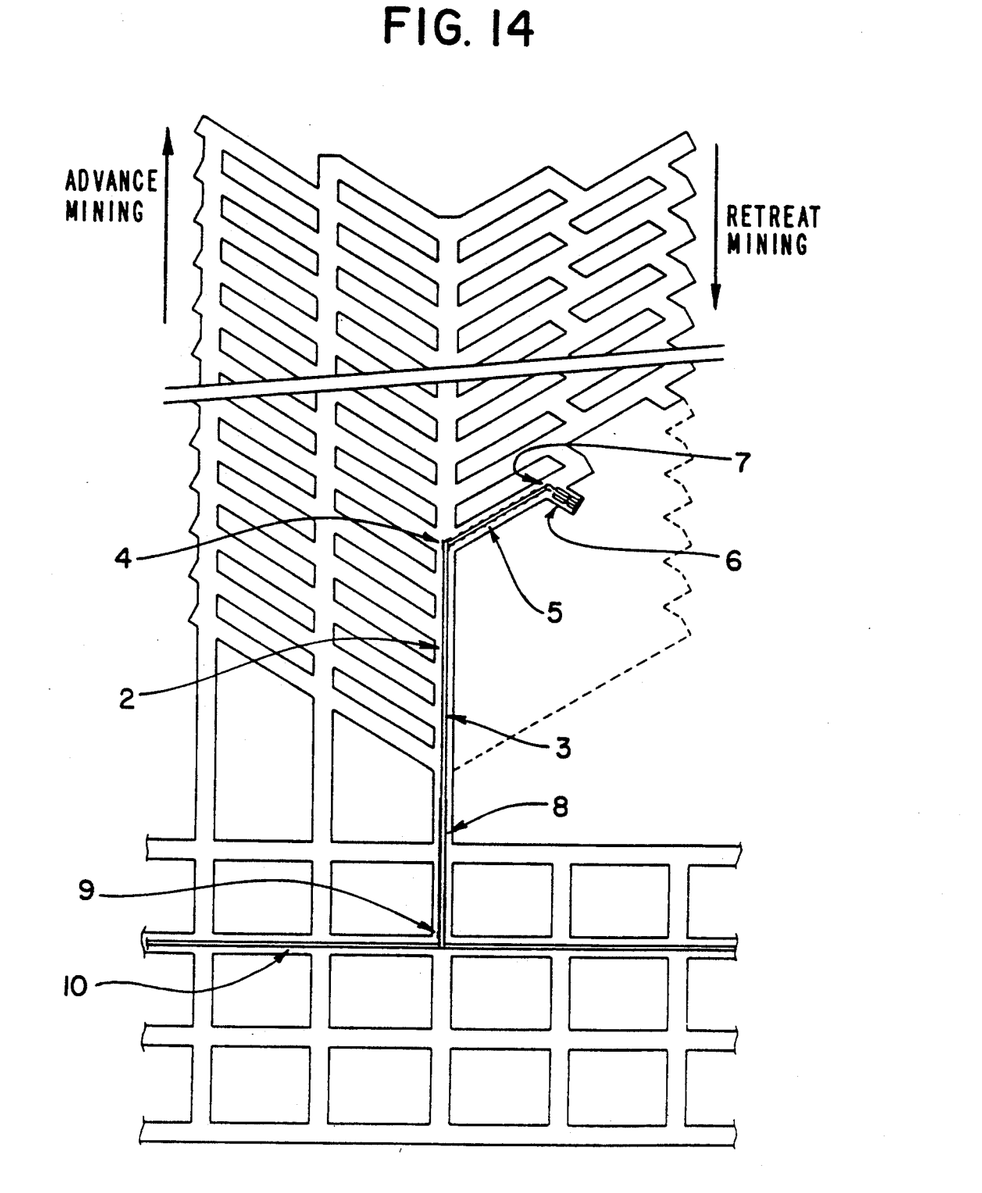
FIG. 14 is a schematic plan view of a known mining technique employing an extensible conveyor system.
Figure 15:
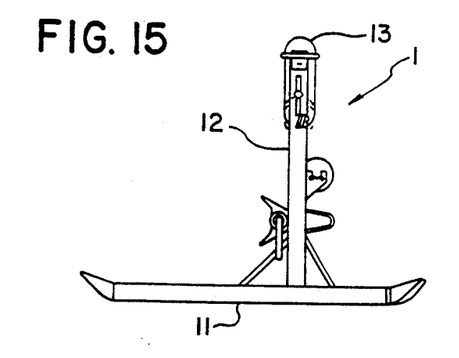
FIGS. 15 and 16 are side elevational and end views, respectively, of a known slidable stand used in the system of FIG. 14.
Figure 16:
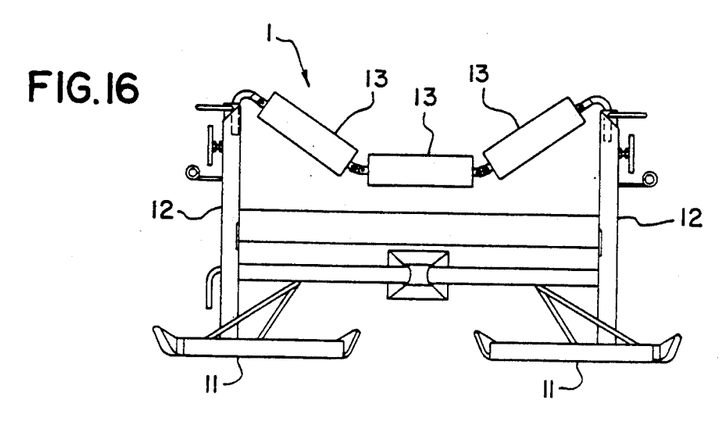

Mining techniques have evolved over the past several years to require larger and larger amounts of conveyor belt extensibility in mining applications, such as, for example, mining of chevron panels, as shown in FIG. 14, in which floor mounted slidable structures 1, as shown in FIGS. 15 and 16, can be conveniently used in the conveyor entry extensible reach portion 2 of an extensible conveyor system 3 for advancing or retreating motions of the angle station 4. A second extensible reach portion 5 of the system 3 is used to enter panel wing rooms with the continuous mining machine 6, to which a trailing conveyor tail unit 7 is attached. At the opposite end of the system, a belt storage magazine 8 supplies additional belting as the system is extended, while a conveyor drive 9 provides a driving force for the belt. Additionally, a trunk conveyor 10 can be used to remove material conveyed by the extensible conveyor system.

Figure 17:
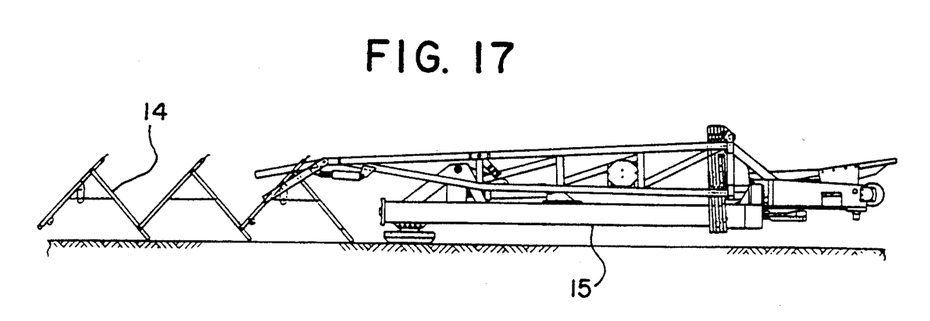
FIG. 17 is a side elevational view of a known A-frame support structure used in the system of FIG. 14.

The slidable structure 1 shown in FIGS. 15 and 16 each include slidable bases 11, vertical supports 12 and troughing strand rollers 13. While these are adequate for use in the first extensible reach 2, a series of A-frame structures 14 mounted on a stand carrier 15, as shown in FIG. 17, can be more conveniently used when entering and mining the panel wing rooms which are the second extensible reach portion 5 of the conveyor. The stand carrier 15 and A-frame structures 14 are described in U.S. Pat. No. 4,860,878.

A continuous haulage system such as used in this type of mining may conveniently use two hundred feet of such slidable structure 1 in the conveyor entry portion and one thousand feet or more of such A-frame structures 14 on a stand carrier 15 in the wing portions of the panel layout. This total amount of extensibility has been uncommon previously in the mining industry.

One disadvantage of the slidable conveyor structure has been that the maximum telescopicity ratio, or ratio of extended length to collapsed length, has a practical limitation of about 20:1. Also, total frictional drag for advancing a group of such stands becomes progressively higher as more stands are used. Retreating of such stands becomes difficult when more than twenty are used in one group, since the flexibility of the connections between the stands makes the group more difficult to steer when being pushed by the tail pulley structure of the extensible conveyor.

Some of these disadvantages have been addressed by the design of the A-frame stand and stand carrier combination, in which a telescopicity ratio of up to 50:1 is possible in practical design configurations. Since the stands are carried rather than being pulled or pushed on the ground, many of the disadvantages of the slidable structure have been avoided such as to make practical the carrying of up to one thousand feet or more of collapsed conveyor structure.

The A-frame structure is not well suited to low seam applications, however, since it typically requires vertical heights of several feet to enable collapse of the structure. It is also relatively light in construction and, thereby, subject to damage if insufficient care is taken when retreating the stand carrier to collect the structure onto its carrying arms.

For these reasons, neither of the above-noted types of conveyor structure will be suitable for a new type of mining application known as "punch mining" or "highwall mining", in which a remotely operated and guided mining machine may be required to advance one thousand feet or more into a thin coal seam for example, from a highwall bench in an open pit mine or in a contour-mining situation.

SUMMARY OF THE INVENTION

An object of the present invention is therefore to provide a mobile belt support structure capable of being advanced and retreated as required to suit the extending and retreating motions of the extensible conveyor.

Another object of the present invention is to provide a method of supporting an extensible conveyor belt in which additional supporting devices can be added to or extracted from a train of support structure in punch mining or highwall mining applications.

Another object of the present invention is to provide a mobile belt support structure which is particularly suitable for any mining application in which extensibility of the conveyor belt is relatively long and/or low in-seam height is desirable.

These and other objects are met by providing a mobile belt support car for a conveyor system having an extensible conveyor belt which includes a troughing strand and a return strand, the car including a longitudinal frame having first and second opposite axial ends, first and second horizontally pivoting joints provided respectively at the first and second opposite axial ends of the longitudinal frame, a transverse beam fixedly connected to the longitudinal frame and having first and second opposite axial ends, first and second wheels supported respectively at the first and second opposite axial ends of the transverse beam, and a first idler frame assembly mounted on the longitudinal frame and including an upper cantilevered beam, a lower cantilevered beam, the first and second cantilevered beams extending towards the extensible conveyor belt, and upper roll means, mounted on the upper cantilevered beam, for supporting the troughing strand of the conveyor belt.

Another aspect of the present invention is to incorporate the aforementioned mobile belt support car into a mobile belt support structure which includes a plurality of such cars interconnected to form a train, the train being used in a mining conveyor system of the type which employs an extensible conveyor belt having a troughing strand and a return strand.

Another aspect of the present invention is to employ the aforementioned mobile belt support structure in a mining method which involves moving the mobile belt support structure from a side of an extensible conveyor belt into alignment with the conveyor belt by moving the mobile belt support structure under the belt and between the two strands of the belt.

These and other objects and features of the invention will become more apparent with reference to the following detailed description and drawings.

DETAILED DESCRIPTION OF THE PREFERRED EMBODIMENTS

Referring now to the figures, a mining conveyor system according to the present invention is generally referred to by the numeral 20, and includes an extensible conveyor belt having an upper troughing strand 22a and a lower return strand 22b. The belt 22 is extensible by virtue of additional belting stored in the belt storage magazine 24. The belt storage magazine 24 is of the type described in U.S. Pat. No. 4,771,880, which is incorporated herein by reference.

A forward end of the belt storage magazine 24 includes a conveyor drive 26 having a head pulley (not shown) around which the conveyor belt 22 turns. A pile of mined material 28, such as coal, is discharged at the head pulley and can be removed easily from the open trench 30, and in particular, from the mining bench 32.

A belt bender station 34 turns the extensible belt up to 90° to form an angled extensible reach portion 36.

That portion of the conveyor belt 22 disposed ahead of the belt bender station 34 constitutes another extensible reach, since the distance between the belt bender station 34 and the conveyor drive 26 can be expanded. As this length is expanded, conventional collapsible belt support structures 38 are deployed to support the belt in the first extensible reach. These structures 38 may be of any conventional type, such as the A-frame type described previously.

Figure 1:
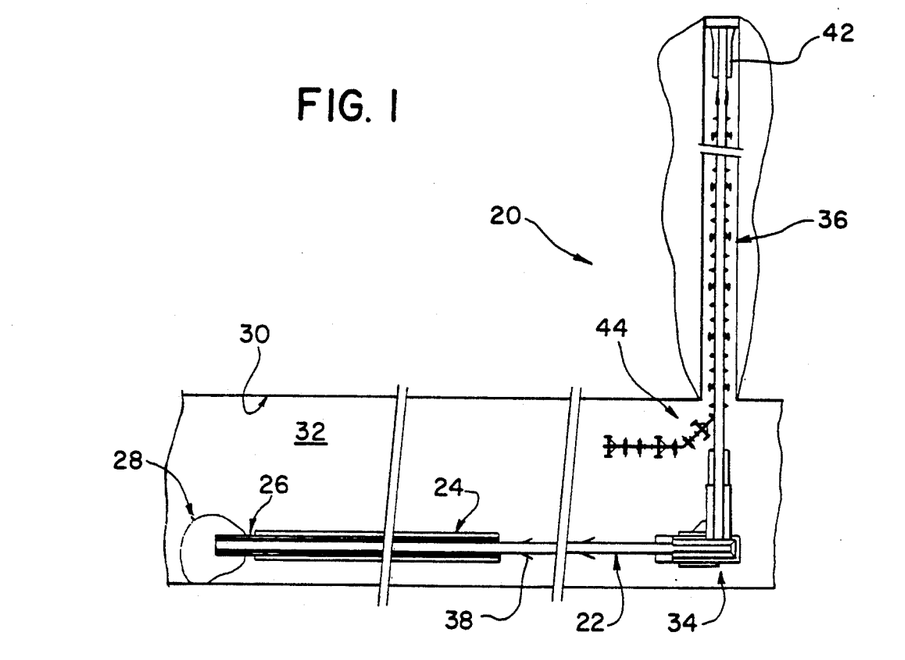
FIG. 1 is a schematic plan view of a highwall mining system employing a conveyor system according to the present invention.

The angled extensible reach 36 is extensible into a highwall face 40 and thus additional belting is taken out of the belt magazine 24. The belt bender 34 may be of the type described in U.S. Pat. No. 4,842,130 which is incorporated herein by reference. In the angled reach portion 36, once the mining machine 42 has entered the highwall 40, a limited amount of space is available and thus conventional belt support structure is inappropriate. According to the present invention, a mobile belt support structure, generally referred to by the numeral 44, is deployed from the side of the extensible reach portion 36. Although the deployment is from the left side as shown in FIG. 1, deployment may likewise be undertaken from the right side, as will be described in greater detail below. Basically, the mobile belt support structure consists of a train of individual belt support cars 46 (FIG. 3) which are interconnected to form the train. The lead car is connected to the mining machine. Either the mining machine or the lead car, or a "mule" disposed therebetween, can carry a tail pulley 48 around which the extensible belt is turned.

Figure 3:
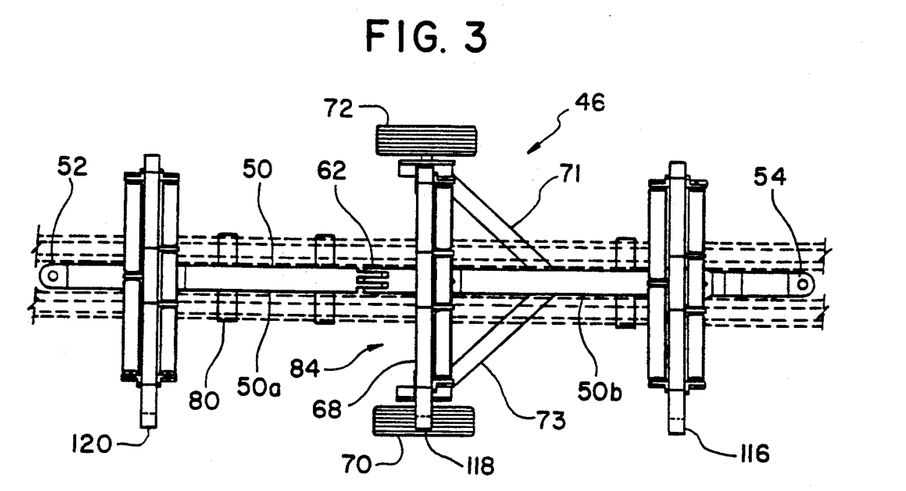
FIG. 3 is a plan view of a mobile belt support car according to the present invention.
Figure 4:
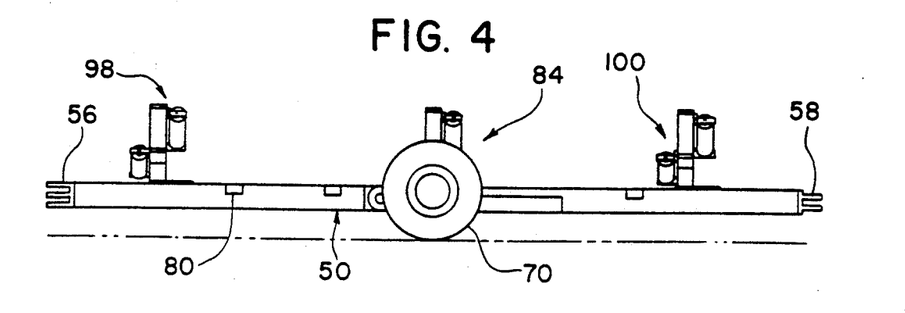
FIG. 4 is a side elevational view of the car illustrated in FIG. 3.
Figure 5A:
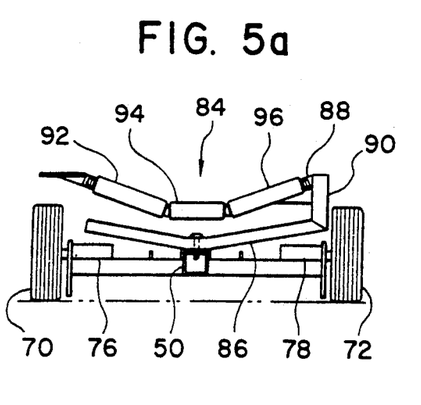
FIGS. 5(a) and 5(b) are end elevational views of the car of FIG. 4, taken at the middle and end sections thereof, respectively.
Figure 5B:
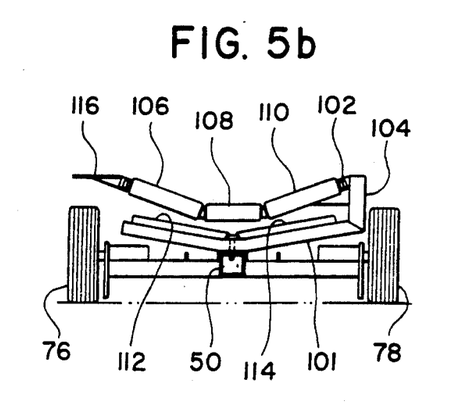
Figure 8A:
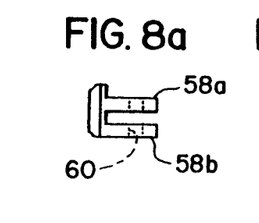
FIGS. 8(a) through 8(c) are side elevational end and top plan views, respectively of a horizontally pivotable joint according to the present invention.
Figure 8B:
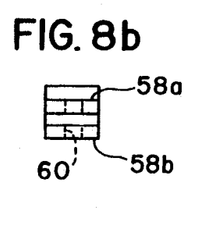
Figure 8C:
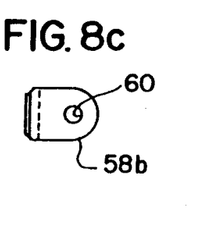

Referring to FIGS. 3-5, each car 46 includes a longitudinal frame 50 having first and second opposite axial ends 52 and 54. First and second horizontally pivoting joints 56 and 58 are provided respectively at the first and second opposite axial ends 52 and 54 of the longitudinal frame 50. These joints are used to couple the car 46 to adjacent cars having corresponding joints. The horizontally pivoting joints are essentially clevis-type structures, as shown in FIGS. 8(a)-8(c), in which the joint includes a pair of arms 58a and 58b having a common bore 60. The joint 56 has a similar construction but may have three arms instead of two, such that the two arms of the joint 58a of one car interleave with the three arms of the joint 56 of another car. Coupling pins then pass through the common bore formed by the interleaved joints to thus couple adjacent cars.

The longitudinal frame is preferably formed by two frame sections 50a and 50b, each carrying one of the joints 56 and 58. The two sections 50a and 50b are interconnected through a vertically pivoting joint which permits the two sections of the frame to pivot relative to each other in a vertical direction.

Figure 7A:
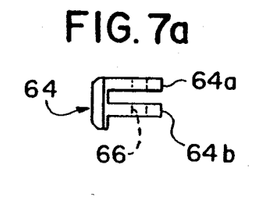
FIGS. 7(a) through 7(c) are top, front, and side elevational views of a vertically pivotal joint according to the present invention.
Figure 7B:
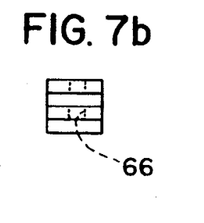
Figure 7C:
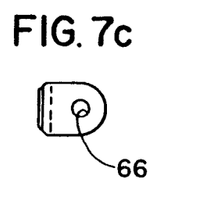

The vertically pivoting joint 62 is similar in construction to the horizontally pivoting joints, in that it essentially comprises two interfitting joint sections having clevis-type arms which interleave and are interconnected through a pivot pin or a coupling pin so as to enable the train of cars to traverse vertical ground undulation. The vertically pivoting joint 62, which is connected to the end of the frame section 50a, is illustrated in FIGS. 7(a) through 7(c) as including two arms 64a through which a common bore 66 is formed. The bore 66 is expanded in the arm 64a to permit slight rocking of the pin when coupled between the two joint portions so as to permit torsional motion or displacement between adjacent belt support cars. The joints are arranged with selective clearance for the connecting pin so as to enable torsional displacement without undue clearance at the pin, such as to allow the train of cars to traverse uneven ground profile.

Figure 6:
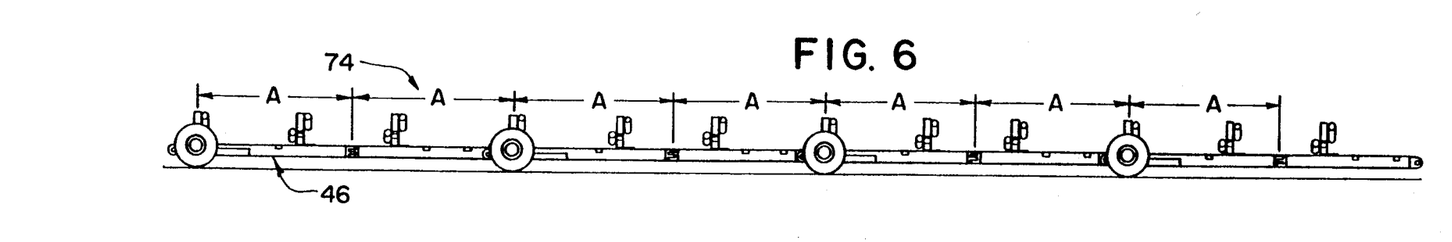
FIG. 6 is a side elevational view showing a plurality of belt support cars assembled into a train as a belt support structure according to the present invention.

A transverse beam 68 is connected to the longitudinal frame 50 so as to provide a support for first and second wheels 70 and 72. However, it is important that the wheels or other means be centered between the two horizontally pivoting joints 56 and 58 so as to facilitate "snaking" of the car, in that when a preceding car turns, the following car will turn at the same point. This can be seen in FIG. 6, in which the distance between the axis of rotation of each set of wheels and each horizontally pivoting joint is the same, as indicated by the letter "A", and thus, in a train consisting of a plurality of coupled cars 46, the train 74 can be advanced and retreated in a controlled and steerable manner, preferably with steerable cars (to be described below) provided at the front and rear. The beam 68 which supports the wheels can be braced by diagonal beams 71 and 73. The wheels themselves are independently driven by hydraulic motors 76 and 78 which have output shafts that directly mount the wheels 70 and 72, respectively. The hydraulic motor is reversible and can be powered from a remote hydraulic power pack or electrical supply (if substituted for with an electric motor) via hydraulic lines or electric cables carried on brackets 80 extending outwardly from the frame 50 at spaced intervals.

Figure 2:
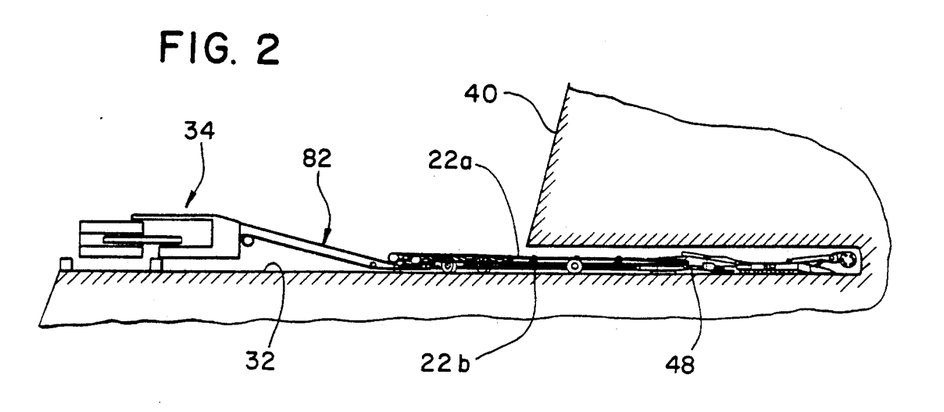
FIG. 2 is a schematic elevational view of the system illustrated in FIG. 1.

As and when the mining machine advances and/or retreats, the mobile belt support structure, consisting of the train 74 is caused to advance/retreat synchronously with a tramming force, provided by the motors, at least sufficient to overcome its own rolling resistance and, if desired, to thrust against the conveyor belt tension forces at the tail pulley 48. Sufficient numbers of the belt support cars 46 are provided on the mining bench 32 to enable both upper and lower strands of the conveyor belt to be supported continuously between the tail pulley position at the rear of the mining machine and a tripper assembly 82 (FIGS. 2 and 13) provided at the belt bender station 34. The tripper assembly is generally known and provides a transition between the relatively high portion of the conveyor belt in the first reach and the relatively low portion of the conveyor belt at the second, angled reach 36.

A first idler frame assembly 84 includes a lower cantilevered beam 86, an upper cantilevered beam 88 and a vertical support beam 90 which interconnects the two cantilevered beams 86 and 88. The lower cantilevered beam 86 is pivotally connected to the longitudinal frame 50 by a conventional pivot pin. The pivot pin allows the idler frame assembly 84 to rotate 180° to change the orientation of the cantilever beams to extend towards one side or the other of the conveyor belt. Once the desired orientation of the frame assembly 84 is achieved, a locking pin (not shown) or other suitable means can be employed to fix the position of the frame assembly 84 relative to the frame 50.

The upper cantilevered beam 88 supports three rollers 92, 94, and 96, the two side rollers 92 and 96 being angled slightly to form a trough-like shape. The upper strand, or the troughing strand 22a of the conveyor belt rests on and is thus supported by these three rollers, whereas the lower strand or return strand passes between the cantilevered beams 86 and 88.

Two or more additional idler frame assemblies 98 and 100 also mounted on the longitudinal frame 50 near the opposite ends 52 and 54. These frame assemblies are similar in construction to the frame assembly 84, and include a lower cantilevered beam 101, an upper cantilevered beam 102 and a vertical support beam 104. In addition to the upper rollers 106, 108, and 110, two lower rollers 112 and 114 are supported by the lower cantilevered beam 101 and thus support the lower return strand of the conveyor belt. In a typical troughing conveyor, the return strand needs half as many supports as the troughing strand, and thus, although lower rollers could have been provided on the first or intermediate frame assembly 84, the rollers would be somewhat superfluous. The various rollers are supported by any conventional means. For example, the cantilevered beams are preferably square box beams, to which angle bar plates can be welded. These plates can be formed with mounting holes to receive support shafts of the rollers. Other suitable means may be employed, so long as the rollers are free to rotate without contacting the supporting beams.

The frame assemblies 98 and 100 are also pivotally mounted to the frame 50 so as to be capable of changing the orientation of the frame assemblies to correspond to the side of the conveyor upon which the train of cars is disposed.

Figure 13:
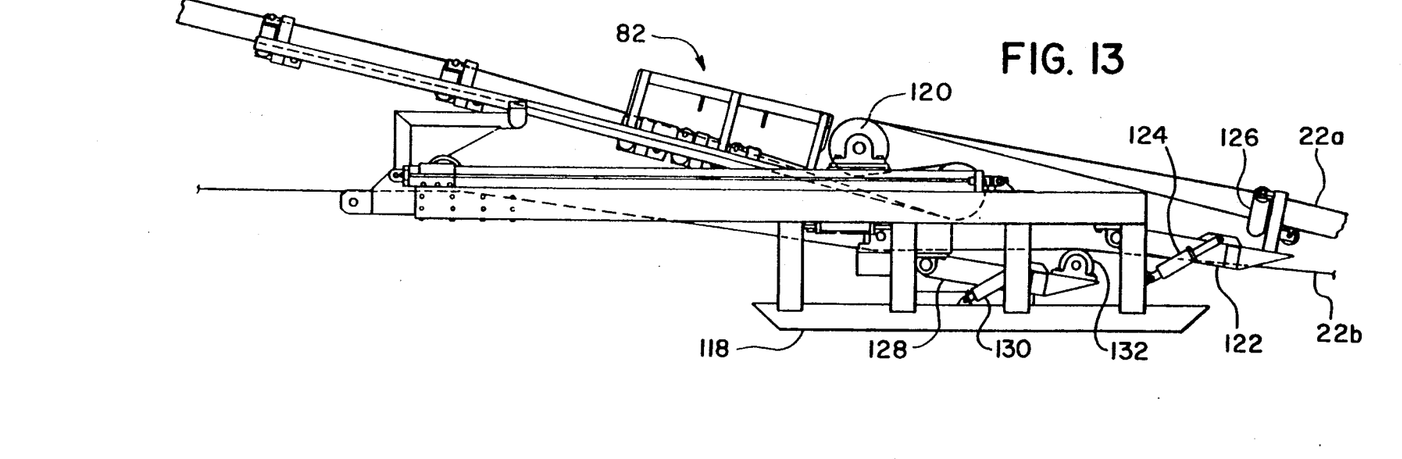
FIG. 13 is a side elevational view of a tripper unit which may be used in the conveyor belt system according to the present invention, and showing means for separating the troughing strand and return strand of the conveyor belt so as to facilitate insertion of the mobile belt support structure according to the present invention.

The pivotal mounting of all three frame assemblies enables the train of connected cars to enter the angled reach of the conveyor belt from either side. For example, with reference to FIG. 1, the mobile belt support structure 44, corresponding to the train of cars 74 is illustrated as entering the reach from the left-hand side. The train of cars could, however, enter from the right-side by simply rotating the frame assemblies 84, 98 and 100 180° so that the cantilevered beams extend towards the conveyor belt. The upper cantilevered beam for each section is provided with an angled extension 116, 118, and 120 to facilitate guiding of the two conveyor belt strands into position. The upper cantilevered beam thus slides between the two conveyor belt strands without having to assemble or disassemble any components of the system. With reference to FIG. 13, the tripper assembly 82 is modified to provide means for adjusting the distance between the two strands of the belt so as to facilitate insertion of the cantilevered beams and corresponding rollers. The tripper assembly 82 is supported on a skid base 118 and carries a head pulley 120. A pivot arm 122 is actuated by a hydraulic cylinder 124 so as to adjust the height of the upper, troughing belt strand 22a by lifting or lowering support rollers 126. Similarly, a support lever 128 actuated by a hydraulic cylinder 130 lifts and lowers a support roller 132 to thereby raise or lower the lower return strand 22b. The combined action of the two cylinders 124 and 130 permit adjustment of the distance between the two belts at the point where the mobile belt support structure enters the angled extensible reach 36.

Figure 9:
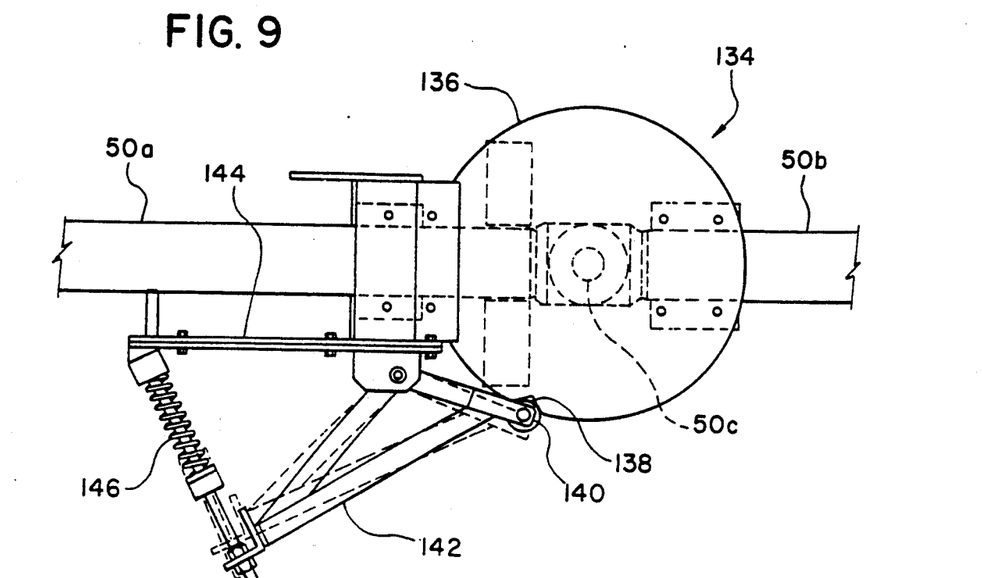
FIG. 9 is a plan view of a detent mechanism used to maintain longitudinal alignment of adjacent cars in the mobile belt support structure according to the present invention.
Figure 10:
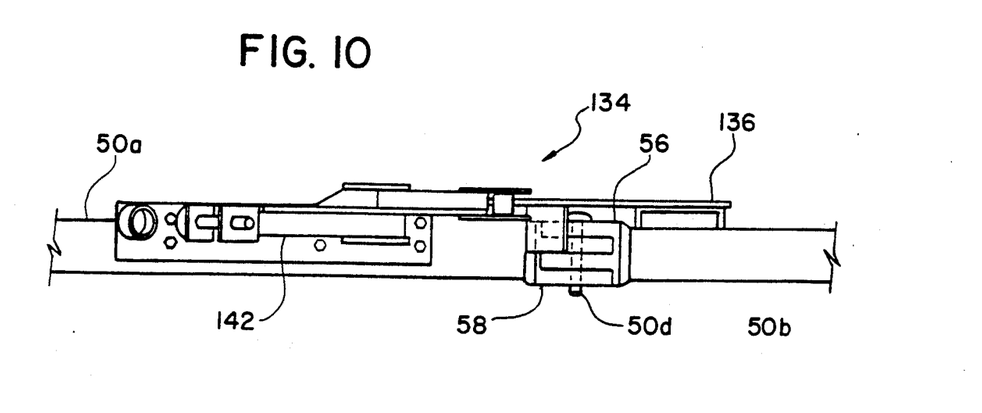
FIG. 10 is a side elevational view of the detent mechanism of FIG. 9.

Referring now to FIGS. 9 and 10, a detent mechanism 134 is provided to maintain linear or straight line tracking of the interconnected cars. At the point of the horizontally pivoting joint, the frame section 50a of one car is coupled to the frame section 50b of an adjacent car, and thus define a vertical pivot axis 50c which permits the two frame sections 50a and 50b to move horizontally relative to each other. The detent mechanism 134 includes a sector plate 136 which is fixedly connected to the frame section 50b of one car. The sector plate 136 has a cut-out notch 138 on a peripheral edge thereof, and positioned so as to normally receive a cam follower or roller 140 mounted on a lever 142, such that the roller 140 fits into the notch 138 when the two frame sections 50a and 50b are aligned. The lever 142 is pivotally connected to the frame section 50a through a supporting bracket 144. An adjustable spring 146 is interposed between the support bracket 144 and the lever 142 to provide a spring bias which pivots the lever 142 so that the roller 140 is biased into the notch 138. When a sufficient turning force is applied to either of the frame sections, the turning force overcomes the spring force, the roller 140 then disengages the notch 138 and the two frame sections 50a and 50b are permitted to rotate about the pivot pin 50d. When the two frame sections 50a and 50b are again axially aligned, the joint is once again rigidized by virtue of the roller and notch.

Figure 11:
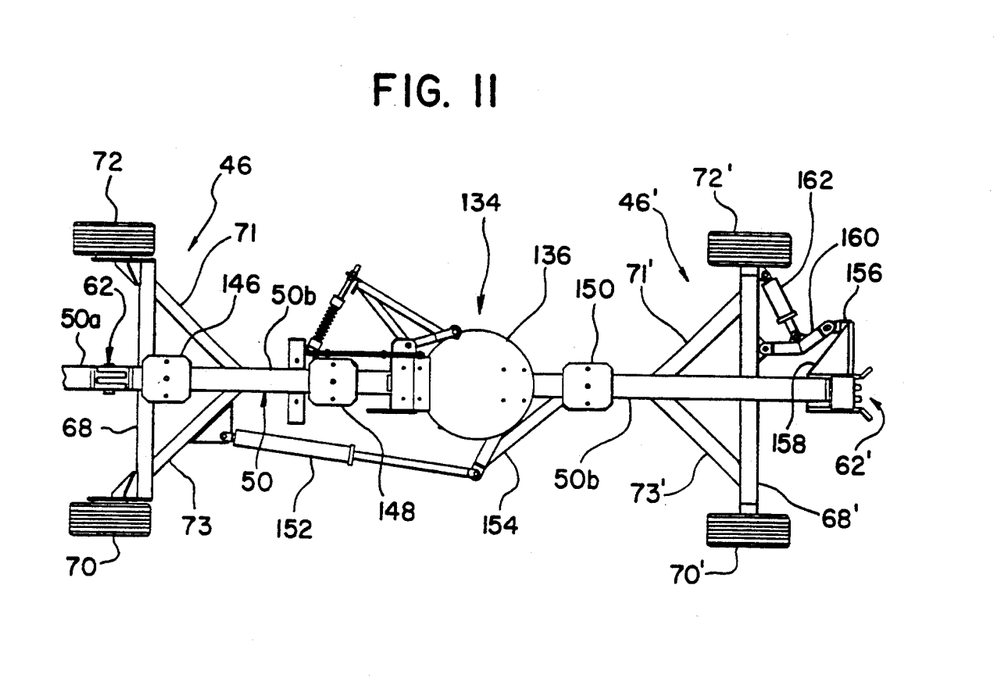
FIG. 11 is a plan view showing a steerable car as a component of the mobile belt support structure according to the present invention.

Referring now to FIG. 11, a steerable car is formed by combining one car 46 with portions of a second car 46'. Thus, the second car portion includes wheels 72' and 70' mounted on a transverse beam 68', which is braced by diagonal beams 71' and 73'. In this particular embodiment, in order to construct a lead car or steerable car, the frame is reversed so that the diagonal beams 71' and 73' angle towards the horizontally pivoting joint provided with the detent mechanism 134. Thus, the frame section corresponds to 50b, so that the horizontally pivoting joint is formed by the interconnection of two frame sections 50b and 50b'. Thus, the lead car is provided with two axles or transverse beams 68 and 68' so as to stand by itself. Brackets 146, 148, and 150 are connected to the frame sections 50b and 50b' to provide support for the idler frame assemblies (removed for clarity of illustration). .

The lead car is made steerable by providing an extensible arm 152 which may be either hydraulic, pneumatic, electric, etc. The extensible arm is connected at one end to the diagonal beam 73, while the opposite end is connected to a support arm 154 which is connected to the frame section 50b'. As the arm 152 is expanded and contracted, the lead car is caused to pivot about the vertical pivot axis of the horizontally pivoting joint associated with the detent mechanism 134.

Figure 12:
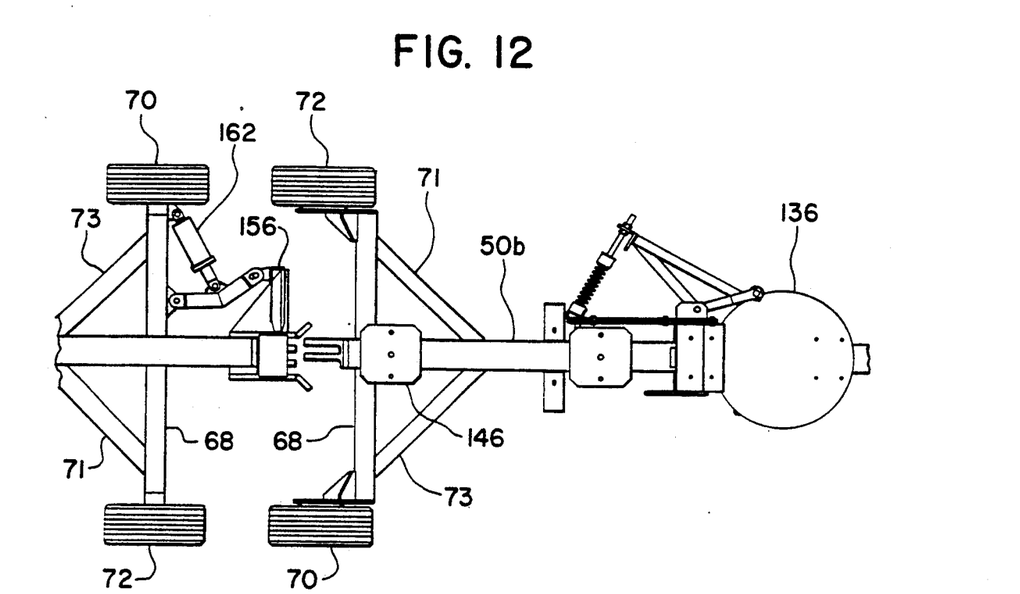
FIG. 12 is a plan view showing a remotely actuated coupling pin capable of detachably coupling the vertically pivoting joints of one or more of the belt support cars of the present invention.

Also shown in FIG. 11 is a remote decoupler device for decoupling the vertically pivoting joint 62' associated with the lead car. A coupling pin 156 is slidably supported in a bracket 158 connected to the frame section 50b' at the vertically pivoting joint 62'. A lever 160 is connected at one end to the coupling pin 156 and at the other end to the transverse beam 68'. An actuating cylinder 162 causes the pin 156 to move in and out of the vertically pivoting joint 62' in order to couple and decouple the joint. The decoupler can be actuated remotely through appropriate lines, either hydraulic, pneumatic, or electric, depending on the type of actuator employed. The decoupler shown in FIG. 11 is thus used to couple the train to the mining machine. However, the remote decoupler could also be used at any point along the train, as shown in FIG. 12 to separate the train into two sections, or to provide tandem axles or transverse beams at points along the train where needed.

During the course of mining according to the present invention, since the mining machine 42 is operated remotely in seams, for example, 1000 feet long, if material falls from the roof of the seam or mining adit onto the conveyor, the mining machine may be prevented from moving forward or is retreating out of the mining adit. Thus, another aspect of the present invention is that, due to the rigid and extremely strong construction of the end-to-end connected longitudinal frame members, a traction device, such as a large bulldozer can be coupled to a rearward most one of the plurality of cars in a train so that the entire train indulging if desired mining machine can be pulled or extracted from the adit by applying tension thereto through the traction device.

Finally, it should be noted that the individual cars may have as few as one idler frame assembly, and as many as may be required to provide support along the length of the frame. In the illustrated embodiment, three idler frame assemblies are shown. This is for illustrative purposes only. Moreover, the middle idler frame assembly, when used with two flanking idler frame assemblies need not be provided with lower rollers, and thus, although a structure may be provided with lower rollers, in practice every idler frame assembly may not have the lower surface of the return strand bearing on the rollers. It is also conceivable that the idler frame assembly may have only one cantilevered beam, that being the upper cantilevered beam, which may be supported simply by a vertical beam connected to the longitudinal frame. However, if the car was provided with only one idler frame assembly, it would be preferable to provide the idler frame assembly with a lower cantilevered beam and lower rollers so as to support the return strand of the belt. It is sufficient to note that, if the car has a plurality of idler frame assemblies, not all of the idler frame assemblies require lower rollers, and if lower rollers are not required, the lower cantilevered beam is not required. However, since in the preferred embodiment the lower cantilevered beam is the mechanism by which the idler frame assembly is mounted to the longitudinal frame, other suitable pivotal mounting means must be provided for the upper cantilevered beam, such as, for example, a vertical beam which supports the cantilevered beam, with the vertical beam being pivotally connected to the longitudinal frame.

Referring to FIGS. 18-21, a different embodiment of a belt support car is generally referred by the numeral 134. The car 134 has essentially the same construction as the belt support car of the previous embodiment, with some variations. For example, the wheels 136 and 138 are driven by an electric motor 140 having a rotary output coupled to a differential 142. This type of drive mechanism can be employed on the previously described embodiment, as well as the embodiment of FIGS. 18-21.

In the embodiment of FIGS. 18-21, the upper support rollers 144, 146, and 148 are supported on a cantilevered beam 150 which is pivotally connected to one lateral side of the car 134 by a vertical, pivotal support post 152. With the aforementioned structure, the upper support rollers 144, 146 and 148 are mounted on a separate structure from the lower support roller 154, and thus, the lower support roller 154 can be axially staggered with respect to the upper support rollers 144, 146 and 148. The lower support roller 154 may be mounted on a simple transverse beam 156 having opposite side brackets 158 and 160 which rotatably mounts the lower support roller 154 therebetween. The transverse beam 156 is fixedly connected to a longitudinal beam 162 by any suitable means, such as a mounting plate 164. Optionally, a pair of guide rollers 166 and 168 may be provided on the side brackets 158 and 160, respectively, so as to restrain lateral motion of the return run 170 of the conveyor belt.

Figure 18:
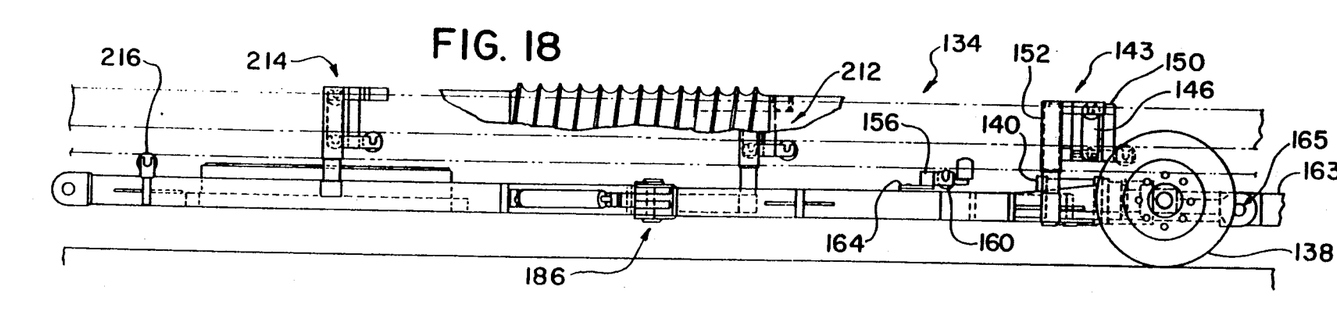
FIG. 18 is a side elevational view of a belt support car according to a second, preferred embodiment of the present invention.
Figure 19:
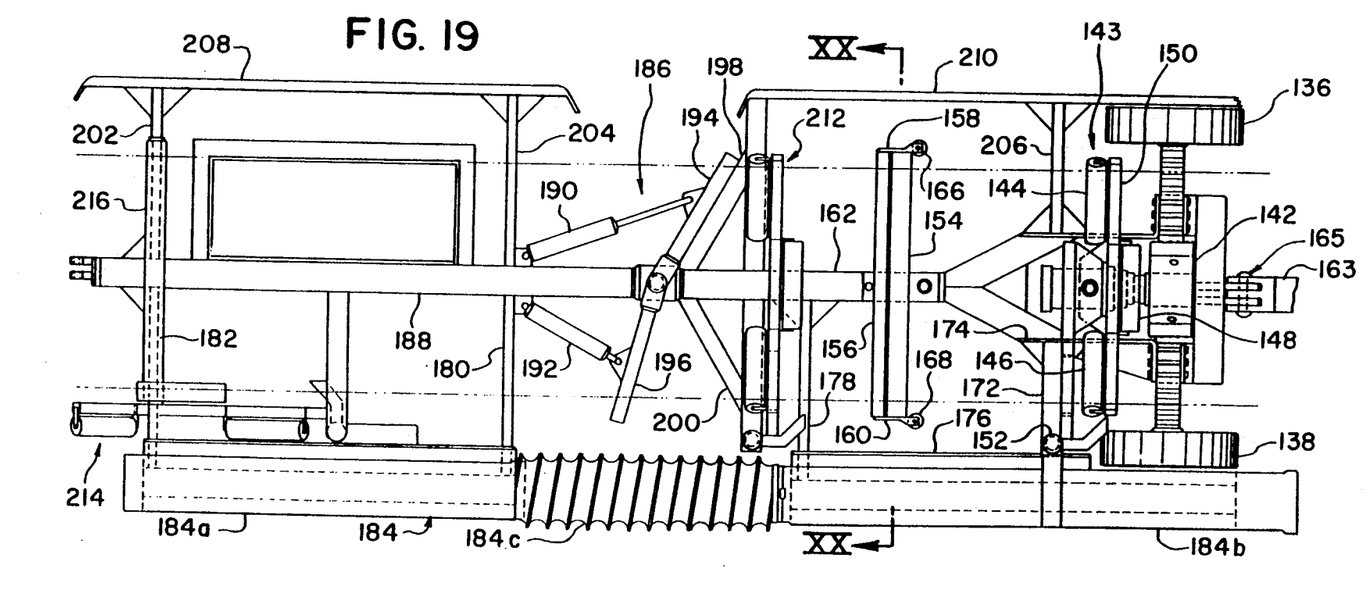
FIG. 19 is a top plan view of the belt support car of FIG. 18.
Figure 20:
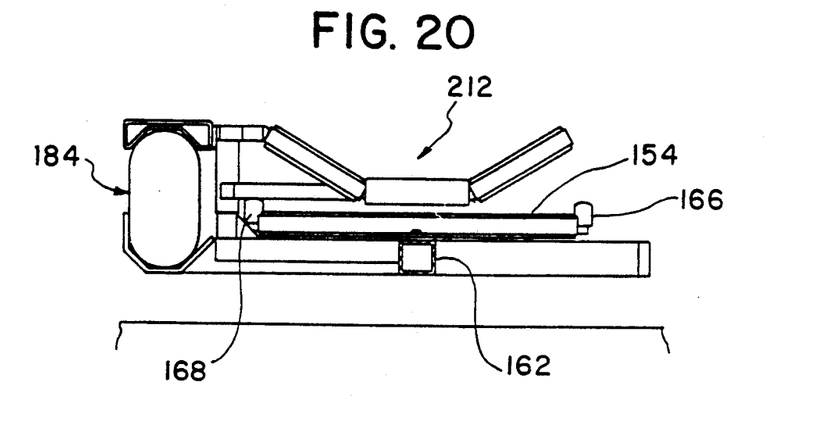
FIG. 20 is a sectional view taken along line XX—XX of FIG. 19.

The vertical pivotal support post 152 is supported on a lateral beam 172 having a proximal end connected to an axle support bracket 174 and a distal end which is connected through a cross beam 176 to another lateral beam 178. Additional lateral beams 180 and 182 are provided to support a ventilation duct 184 having rigid sections 184a and 184b, and a flexible section 184c provided at the horizontally pivotal joint 186. The longitudinal beam 162 and pivotally connected longitudinal beam 188 pivot horizontally relative to each other about a vertical pivot axis so as to permit tracking of interconnected cars which form a mobile belt support structure as in the previous embodiment. As in the previous embodiment, means are provided for locking the horizontally pivotal joint 186 to maintain straight line movement of a train of cars until such time as it is necessary to make a turn. The means for locking the horizontally pivot joint 186 includes a pair of extensible arms 190 and 192, each being connected pivotally through brackets to the longitudinal beam 188, whereas the opposite ends are connected through brackets to swing arms 194 and 196, respectively, which are pivotally connected at the horizontally pivotal joint 186 for movement about the vertical pivot axis of the horizontally pivotal joint.

When the extensible arms 190 and 192 are in the locking position, the swing arms 194 and 196 are in abutment with acutely angled brace beams 198 and 200, respectively so as to prevent the longitudinal beams 162 and 188 from pivoting relative to each other. If it is desired to make a turn, however, one or both of the extensible arms 190 and 192 can be actuated to retract and thereby move the swing arms 194 and 196 out of abutment with the brace beams 198 and 200, respectively. In FIG. 19, the extensible arm 192 is shown in the retracted position in which the two longitudinal beams 162 and 188 would be permitted to turn to one lateral side.

On the opposite lateral side of the belt support car 134, additional lateral beams 202, 204 and 206 are provided to support lateral skid beams 208 and 210 which can be provided on the lateral side opposite from the side which supports the ventilation duct 184.

Additional upper support roller assemblies 212 and 214 have the same construction as that of the upper support roller assembly 143. In FIG. 19, upper support roller assembly 214 is shown pivoted to the lateral side, whereas in FIG. 18, all three of the upper support roller assemblies are shown in their supporting, transverse position. An additional lower support roller 216 is mounted on lateral beams 202 and 182 to be rotatably mounted between opposite side support brackets.

With the embodiment described with respect to FIGS. 18-20, the upper support arm may not necessarily be rotatable for entry to the belt line from either side but may still be pivotal on the vertical support posts for another purpose. In particular, when taller tires are required and the possibility exists that the tires of the wheels may inhibit entry under the belt due to the height of the tires it thus becomes more difficult to enter the belt support train under the belt line directly from the side. This problem is solved by swinging the upper support arm assembly to the side and driving under the lower belt strand or return run of the conveyor belt. As the belt support car moves forwardly, first the lower strand or return run of the conveyor belt settles onto the lower support roller and then the swing arm is swung into place, into its transverse orientation before the upper strand or troughing run of the conveyor belt settles into place on the upper support rollers. Thus, the embodiment of FIGS. 18-20 facilitates the use of larger wheels, which provide better ground clearance while at the same time facilitating entry of the belt support train into the conveyor belt line.

The belt support car 134 of FIGS. 18-20 can have different configurations, but preferably has the one longitudinal beam 162 and a second longitudinal beam 163 which is pivotally connected to the longitudinal beam 162 at a vertically pivotal joint 165 which, as in the previous embodiment, facilitates relative vertical movement between the two beams 162 and 163 by pivoting about a horizontal pivot axis. Thus, in the embodiment of FIGS. 18-20, the longitudinal beam 188 would normally be part of an adjacent belt support car so that preferably, the belt support car 134 has a horizontally pivotal joint 186 provided at the distal end of the first beam 162 and a second horizontally pivotal joint (not shown) at the distal end of the beam 163, and a vertically pivotal joint 165 pivotally interconnecting the proximal ends of the beams 162 and 163. In this regard, the beam 163 would have the same structure as the beam 188 in that there would be a lower support roller 216 and an upper support roller assembly 214. The number of upper support roller assemblies and lower support rollers, for each car, would depend on the length of the beams 163 and 162, however. For example, in the preferred embodiment in which three upper support roller assemblies are used on each car, the overall length of the car between the horizontally pivotal joints 186 provided at the opposite ends thereof would be, for example, about twenty feet. Longer cars would require additional support rollers. Moreover, depending on the type of ore or material being mined, greater or lesser numbers of support rollers can be used.

What is claimed is:

1. A mobile belt support car for an extensible conveyor belt having an upper troughing strand and a lower return strand, the car comprising:
   a frame carried by wheels and being movable from a tangential direction to a position under the lower return strand; and
   troughing strand support means, movable to a position under the upper troughing strand when the frame is moved under the return strand,
   wherein the troughing strand support means comprises a first idler assembly mounted on the frame and including an upper horizontally disposed cantilevered beam, the upper cantilevered beam having a distal end which passes between the upper troughing strand and the return strand.

2. A mobile belt support car according to claim 1, further comprising first and second horizontally pivoting joint means, provided respectively at first and second opposite axial ends of the frame, for interconnecting end-to-end adjacent cars, and for permitting relative horizontal motion between two adjacent cars.

3. A mobile belt support car according to claim 2, wherein the troughing strand support means further includes upper roll means, mounted on the upper cantilevered beam, for supporting the troughing strand of the extensible conveyor belt.

4. A mobile belt support car according to claim 2, wherein the first idler assembly further includes a lower cantilevered beam pivotally connected to the frame, a vertical support beam interconnecting the first and second cantilevered beams, and lower roll means, mounted on the lower cantilevered beam, for supporting the return strand of the conveyor belt.

5. A mobile belt support car according to claim 2, wherein the car is supported on first and second wheels having a rotation axis longitudinally centered between the first and second horizontally pivoting joints, so that a train of interconnected cars are caused to track each other.

6. A mobile belt support car according to claim 1, wherein the frame comprises first and second frame sections and vertically pivoting means for pivotally connecting the first and second frame sections end-to-end, thereby allowing a train of cars to traverse vertical ground undulations.

7. A mobile belt support car according to claim 1, wherein the troughing stand support means is pivotally mounted on the frame.

8. A mobile belt support car according to claim 3, further comprising second and third idler assemblies respectively mounted on the frame, each of the second and third idler assemblies comprising an upper cantilevered beam for supporting the troughing strand of the extensible conveyor belt, a lower cantilevered beam pivotally connected to the longitudinal frame, and lower roll means, mounted on the lower cantilevered beam, for supporting the return strand of the conveyor belt.

9. A mobile belt support car according to claim 5, further comprising drive means, coupled to the first and second wheels, for driving the first and second wheels and thereby moving the mobile belt support structure selectively in advance and retreat directions.

10. A mobile belt support car according to claim 9, wherein the drive means comprises first and second motors operatively coupled respectively to the first and second wheels.

11. A mobile belt support car according to claim 6, wherein the vertically pivoting means includes a clevis-type joint having a selected clearance between horizontally oriented connecting pin and a corresponding mounting bore.

12. A mobile belt support car according to claim 1, further comprising a plurality of support brackets connected at spaced intervals along the frame to carry services lines.

* * * * *